Patented Dec. 12, 1950

2,533,939

UNITED STATES PATENT OFFICE 2,533,939

ACETIC ACID ESTERS OF ARALKYL ALCOHOLS AND METHOD FOR THEIR PRODUCTION

Edward Levant Jenner, Wilmington, Del., assignor to E. I. du Pont de Nemours & Company, Wilmington, Del., a corporation of Delaware No Drawing. Application October 2, 1947, Serial No. 777,592

5 Claims. (Cl. 260—488)

This invention relates to the preparation of esters.

When ethylenically unsaturated compounds are treated with sulfuric acid, any reaction that takes place usually does so by polymerization of unsaturated material or by addition reactions of the acid to the double bond. When organic acids are used, the reaction that usually takes place is simple addition of acid to unsaturated compound in equimolar ratios to produce simple esters. A combination of the two reagents has in some cases given hydrocarbons as the principal new product.

This invention has as an object the preparation of esters from styrene and lower alkanoic acids. Other objects will appear hereinafter.

These objects are accomplished by the following invention wherein styrene is reacted under anhydrous conditions with an alkanoic acid of one to six carbons in the presence of an oxygen-containing acid the ionization constant of which in absolute ethanol is greater than 0.001, preferably perchloric acid.

In general the process of this invention is carried out by reacting styrene with the lower alkanoic acid, e. g., acetic or propionic acid, in the presence of minor amounts of perchloric acid for usually 2 to 50 hours at approximately room temperature. The carboxylic acid esters thus produced are purified by distillation from the reaction mixture or isolated by removal of unreacted acid and olefinic hydrocarbon monomeric material present. The products obtained are esters which may be represented by the empirical formula H(Y)$_n$OOCR, in which Y is a divalent radical derived from the olefinic hydrocarbon and $n$ is a plural integer, usually from 2 to 4, and RCO is an acyl radical, e. g. CH$_3$CO—, C$_2$H$_5$CO—.

The more detailed practice of the invention is illustrated by the following examples wherein, unless otherwise indicated, parts are by weight and degrees are degrees centigrade. There are, of course, many forms of the invention other than these specific embodiments.

Example

A solution was prepared by dissolving 16.7 parts of 70% aqueous perchloric acid and 27 parts of acetic anhydride (sufficient to react with the water in the aqueous perchloric acid solution) in 1050 parts of glacial acetic acid. One hundred and one parts of styrene was added and the slightly cloudy mixture turned pale yellow over a period of 5 hours at 25° C. At the end of this time, a saturated acetic acid solution containing 13 parts of potassium acetate was added. The precipitated potassium perchlorate was removed and the acetic acid distilled under reduced pressure. At this stage some unreacted styrene was recovered. Upon the distillation of the residue, the following fractions were obtained:

| Fraction | Parts | B. P. |
|---|---|---|
| 1 | 18.5 | 45–47°/0.4 mm. |
| 2 | 27.7 | 113–128°/0.4 mm. |
| 3 | 8.0 | 126–130°/0.3 mm. |
| 4 | 33.4 | undistilled residue |
|   | 87.6 |   |

Fraction 3 was identified as the acetate of an alcohol containing two styrene residues corresponding to the formula

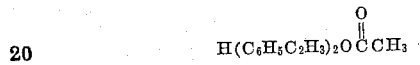

Calculated: Saponification equivalent 268.3; C, 80.56; H, 7.51. Found: Saponification equivalent 253.3; C, 80.70; H, 7.87. Fraction 2 was shown by analysis to consist mainly of the same ester as fraction 3.

The process of this invention is generic to the reaction of a lower alkanoic acid under anhydrous conditions and in the presence of an acid of ionization constant of at least 0.001 in absolute ethanol, with styrene.

The process of this invention is carried out in an anhydrous system and the acid catalysts employed are oxygen-containing acids whose acidic dissociation constants in absolute ethanol are at least 0.001 [see A. J. Deyrup, J. Am. Chem. Soc. 56, 63 (1934), and L. P. Hammett, Physical Organic Chemistry, McGraw-Hill Book Company (1940), page 261]. Preferrred catalysts are perchloric acid, fluosulfonic acid, and methane-trisulfonic acid. Other useful catalysts include hydrocarbon sulfonic acids such as benzenesulfonic acid, toluenesulfonic acid, methanesulfonic acid, ethanedisulfonic acid; monoesters of sulfuric acid such as methyl hydrogen sulfate and butyl hydrogen sulfate; difluophosphoric acid; sulfuric acid; and chlorosulfonic acid.

The reaction may be carried out at a temperature of —40 to 100° C., although 20–40° C. is preferred. The time of the reaction may be as little as a few minutes, although 2–100 hours are usually sufficient for reaction. It is to be understood that the time and temperature employed are interdependent variables and also depend upon the specific olefinic hydrocarbon employed as well as the acid concentration. In general 0.02–5 parts (by weight) of olefinic hydrocarbon are employed with 0.2–0.001 part of perchloric or other strong acid per part of carboxylic acid, although optimum results are usually obtained when 0.05–0.5 part of olefinic hydrocarbon is employed with 0.05–0.002 part of perchloric acid per part of carboxylic acid.

In the process of this invention there may be employed any alkanoic acid of the formula $$C_nH_{2n+1}COOH$$

where $n$ is a cardinal number up to 5.

Illustrative acids which may be employed in the process of this invention are formic, acetic, propionic, butyric, isobutyric, and trimethylacetic acids.

When the acid employed is not a liquid at the temperature of the reaction, a solvent such as nitrobenzene, the lower nitrohydrocarbons, or halogenated hydrocarbons such as chlorobenzene and trichloroethylene may be employed.

The products of this invention are useful in many applications, for example, in the preparation of drying oil intermediates and the preparation of saturated alcohols. The products from styrene or similar compounds are useful as plasticizers or intermediates.

The foregoing detailed description has been given for clearness of understanding only and no unnecessary limitations are to be understood therefrom. The invention is not limited to the exact details shown and described for obvious modifications will occur to those skilled in the art.

What is claimed is:

1. Process which comprises reacting styrene with acetic acid in the presence of perchloric acid.
2. An ester of the formula $$H(C_6H_5C_2H_3)_2O.CO.CH_3$$

3. An ester composition of the formula $$H(C_6H_5C_2H_3)_nO.CO.CH_3$$

where $n$ is an integer from 2 to 4.

4. An ester composition of the formula $$H(C_6H_5C_2H_3)_nO\text{—}Ac$$

wherein $n$ is an integer from 2 to 4 and Ac is the acyl radical of an alkanoic acid of one to six carbons.

5. A process which comprises reacting styrene with an alkanoic acid of one to six carbons in the presence of perchloric acid.

EDWARD LEVANT JENNER.

REFERENCES CITED

The following references are of record in the file of this patent:

UNITED STATES PATENTS

| Number | Name | Date |
|---|---|---|
| 1,790,521 | Davis | Jan. 27, 1931 |
| 2,006,734 | Edlund et al. | July 2, 1935 |
| 2,198,046 | Vierling | Apr. 23, 1940 |
| 2,402,137 | Hanford | June 18, 1946 |
| 2,485,125 | Wilkinson | Oct. 18, 1949 |